(12) United States Patent
Malvern et al.

(10) Patent No.: US 7,047,808 B2
(45) Date of Patent: May 23, 2006

(54) ACCELEROMETER

(75) Inventors: Alan R Malvern, Plymouth (GB);
Mark A Venables, Filton (GB);
Nicolass F DeRooij, Neuchatel (CH)

(73) Assignee: Bae Systems plc, London (GB)

( * ) Notice: Subject to any disclaimer, the term of this patent is extended or adjusted under 35 U.S.C. 154(b) by 19 days.

(21) Appl. No.: 10/491,777

(22) PCT Filed: Feb. 10, 2004

(86) PCT No.: PCT/GB2004/000493

§ 371 (c)(1),
(2), (4) Date: Apr. 6, 2004

(87) PCT Pub. No.: WO2004/076340

PCT Pub. Date: Sep. 10, 2004

(65) Prior Publication Data

US 2005/0081632 A1    Apr. 21, 2005

(30) Foreign Application Priority Data

Feb. 28, 2003    (EP)    ............................. 03251240.2
Feb. 28, 2003    (GB)    ............................. 0304595.2

(51) Int. Cl.
*G01P 15/00*    (2006.01)

(52) U.S. Cl. ................................................. 73/514.12

(58) Field of Classification Search ............. 73/514.18, 73/504.12, 514.32, 514.14; 361/277, 280, 361/283.3; 324/658, 660, 661

See application file for complete search history.

(56) References Cited

U.S. PATENT DOCUMENTS 3,877,313 A    4/1975    Ferriss ................... 73/514.05

(Continued)

FOREIGN PATENT DOCUMENTS

DE    196 39 946 A    4/1998

(Continued)

*Primary Examiner*—Hezron Williams
*Assistant Examiner*—Tamiko Bellamy
(74) *Attorney, Agent, or Firm*—Nixon & Vanderhye P.C.

(57) ABSTRACT

An accelerometer having a plate-like proof mass (1), flexible mounting legs (2) each co-planar with the proof mass (1), a ring-like support (3), in which the proof mass (1) is moveably mounted, with each mounting leg (2) being connected at one end to the proof mass (1) and connected at another end to the support (3) and with the mounting legs (2) extending substantially perpendicularly to the sensing direction, a plurality of interdigitated capacitor fingers mounted, in a gaseous medium, in the ring-like support (3) for sensing linear movement of, and for providing gaseous medium squeeze damping for the proof mass (1) in the sensing direction, with the fingers, proof mass (1), mounting legs (2) and support (3) being co-planar and formed from a single plate of mono-crystalline silicon, which fingers comprise fixed first, second, third and fourth arrays (5, 6, 7, 8) of laterally spaced fingers extending substantially perpendicularly to the sensing direction and away from the support (3) towards to the proof mass (1), and moveable fifth, sixth, seventh and eighth arrays (10, 11, 12, 13) of laterally spaced fingers extending substantially perpendicularly to the sensing direction from and attached to the proof mass (1) towards the support (3), with the interdigitation of the first and fifth arrays (5, 10) and of the third and seventh arrays (7, 12) being at a first offset in one direction in the sensing direction from a median line between adjacent fingers in the first, second, third and fourth arrays (5, 6, 7, 8), and with the interdigitation of the second and sixth arrays (6, 11) and of the fourth and eighth arrays (8, 13) being at a second offset equal and in the opposite direction to the first offset and means for providing a first drive voltage to the first offset arrays (5, 10, 7, 12) of fingers and an equal and opposite second drive voltage to the second offset arrays (6, 11, 8, 13) of fingers such that the interdigitated fingers provide for the proof mass sensing of displacement in response to acceleration applied to the accelerometer, drive and damping of displacement.

10 Claims, 5 Drawing Sheets

U.S. PATENT DOCUMENTS

| | | | |
|---|---|---|---|
| 4,342,227 A | 8/1982 | Petersen et al. | 73/510 |
| 4,345,474 A | 8/1982 | Deval | 73/514.18 |
| 4,503,391 A | 3/1985 | Hinke | 324/207.22 |
| 4,600,934 A | 7/1986 | Aine et al. | 428/450 |
| 4,663,972 A | 5/1987 | Gerard | 73/514.21 |
| 4,711,128 A | 12/1987 | Boura | 73/514.18 |
| 4,893,509 A | 1/1990 | MacIver et al. | 73/514.29 |
| 5,025,346 A | 6/1991 | Tang et al. | 361/283.1 |
| 5,251,484 A * | 10/1993 | Mastache | 73/514.02 |
| 5,345,824 A | 9/1994 | Sherman et al. | 73/514.18 |
| 5,447,067 A | 9/1995 | Biebl et al. | 73/514.32 |
| 5,569,852 A | 10/1996 | Marek et al. | 73/514.32 |
| 5,983,721 A * | 11/1999 | Sulzberger et al. | 73/514.32 |
| 6,032,532 A * | 3/2000 | Brun et al. | 73/514.32 |
| 2003/0010123 A1* | 1/2003 | Malvern et al. | 73/514.32 |

FOREIGN PATENT DOCUMENTS

| | | |
|---|---|---|
| EP | 0 890 978 A | 1/1999 |
| WO | WO 92/03740 | 3/1992 |
| WO | 01/51931 A | 7/2001 |

* cited by examiner

ACCELEROMETER

This application is the US national phase of international application PCT/GB2004100493, filed in English on 10 Feb. 2004, which designated the US. PCT/GB2004/00493 claims priority to GB Application No. 0304595.2, filed 28 Feb. 2003 and EP Application No. 03251240.2, filed 28 Feb. 2003. The entire contents of these applications are incorporated herein by reference.

This invention relates to a capacitive accelerometer made at least in part from silicon. Conventional capacitive silicon accelerometers conventionally comprise a proof mass on a thin suspension so as to form a pendulum which is sandwiched between two fixed capacitor plates each at a small gap from the proof mass. Under the effect of acceleration on the accelerometer one gap increases and the other decreases to give a differential output signal. Such conventional accelerometers require very close matching of the two capacitor gaps to eliminate effects such as vibration rectification. A Direct Current voltage bias normally is applied to the proof mass to linearise the electrostatic drive voltage needed to null the proof mass position.

The development of deep trench etching in silicon has permitted the fabrication of complex structure gyroscopes in one process step within the plane of a silicon wafer. Such a manufacturing technology has been applied to accelerometer construction with the benefit of reducing costs of manufacture whilst retaining a very high position accuracy and enabling a large number of devices to be fabricated at the same time.

Constructions which use interdigitated fingers for the application of electrostatic forces are known including the use of offset interdigitated fingers. Offset interdigitated fingers give rise to electrostatic forces by the application of voltages between the fingers but the amplification effect derived from the use of a multiplicity of interdigitated fingers can be non-linear due to the fringing fields.

There is thus a need for an improved capacitive accelerometer utilising offset interdigitated fingers which at least minimises the foregoing disadvantages, preferably improves linearisation of the force between the fingers with applied voltage and preferably improves the deflection of the proof mass for a given voltage.

Accordingly to a first aspect of the present invention there is provided an accelerometer having a substantially planar plate-like proof mass, four or more flexible mounting legs each co-planar with the proof mass, a substantially planar ring-like support, in which the proof mass is movably mounted, which support is fixedly mounted relative to the proof mass and co-planer therewith, with each mounting leg being connected at one end to the proof mass and connected at another end to the support so that the proof mass is mounted for linear movement in a sensing direction in the plane containing the proof mass, mounting legs and support, in response to acceleration change applied to the accelerometer, and with the mounting legs extending substantially perpendicularly to the sensing direction, a plurality of interdigitated capacitor fingers mounted, in a gaseous medium, in the ring-like support for sensing linear movement of, and for providing gaseous medium squeeze damping for, the proof mass in the sensing direction, with the fingers, proof mass, mounting legs and support being co-planar and formed from a single plate of mono-crystalline silicon, which fingers comprise fixed, first, second, third and fourth arrays of laterally spaced fingers extending substantially perpendicularly to the sensing direction away from the support towards the proof mass, with the first and second arrays being located on one side of the proof mass and with the third and fourth arrays being located on the opposite side of the proof mass, and moveable fifth, sixth, seventh and eighth arrays of laterally spaced fingers extending substantially perpendicularly to the sensing direction from and attached to the proof mass towards the support, with the fifth and sixth arrays being located on said one side of the proof mass and interdigitated respectively with the first and second arrays and with the seventh and eighth arrays being located on said opposite side of the proof mass and interdigitated respectively with the third and fourth arrays, with the interdigitation of the first and fifth arrays and of the third and seventh arrays being at a first offset in one direction in the sensing direction from a median line between adjacent fingers in the first, second, third and fourth arrays, and with the interdigitation of the second and sixth arrays and of the fourth and eighth arrays being at a second offset equal and in the opposite direction to the first offset, and means for providing a first drive voltage to the first offset arrays of fingers and an equal and opposite second drive voltage to the second offset arrays of fingers, such that the interdigitated fingers provide for the proof mass sensing of displacement in response to acceleration applied to the accelerometer, drive and damping of displacement.

The provision of gaseous medium squeeze film damping using interdigitated fingers with capacitive force feedback in this way ensures that with low drive voltages it is possible to achieve a linear output with the input acceleration proportional to an output voltage.

Preferably the proof mass, mounting legs, support and interdigitated fingers are formed by dry etching from a plate of silicon which is orientated in (111) or (100) crystal plane.

Conveniently the support has a substantially rectangular ring-like shape surrounding an inner open area in which is located the proof mass which has a substantially rectangular shape, and wherein the mounting legs extend substantially perpendicularly to the sensing direction in spaced array, with at least two between a first inner wall of the support defining the inner open area and a facing first outer wall of the proof mass and with at least two between an opposing second inner wall of the support defining the inner open area and a facing second outer wall the proof mass.

Advantageously, the mounting legs have high compliance in the sensing direction and low compliance in other directions.

Preferably the accelerometer includes a support sheet of non-conductive material on which is fixedly mounted the support and first, second, third and fourth arrays of fingers with the mounting legs, proof mass and fifth, sixth, seventh and eighth arrays of fingers being spaced from the support sheet.

Conveniently the support sheet is made of glass to which the support and first, second, third and fourth arrays of fingers are fixedly mounted by anodic bonding.

Advantageously the accelerometer includes at least four earth screens located within the inner open area, each being associated with and partially surrounding a respective one of the first, second, third and fourth arrays of fingers, being operable to shield the arrays of fingers from the support and being electrically insulated from the support.

Conveniently the earth screens are fixedly mounted by anodic bonding on the glass support sheet.

Preferably the accelerometer includes means for supplying a square wave drive voltage to the fixed third and fourth finger arrays in anti-phase, which means includes a square wave generator, an in-phase unit for receiving an output signal from the square wave generator and for supplying an in-phase signal to the third array of fingers, an anti-phase unit for receiving an output signal from the square wave generator and for supplying an anti-phase signal to the fourth array of fingers, a demodulator for receiving a frequency signal from the square wave generator, a device for supplying a direct current bias voltage through the proof mass, a capacitor for receiving an output signal from the proof mass, an integrator for receiving an output signal from the capacitor, an Alternating Current gain unit for receiving an output signal from the integrator, a band-pass filter for receiving an output signal from the Alternating Current gain unit and for passing an output signal to the demodulator, a loop filter for receiving an output signal from the demodulator, a Direct Current gain unit for receiving an output signal from the loop filter, a positive gain unit for receiving an output signal from the Direct Current gain unit and for passing a positive output signal to the second array of fingers and a negative gain unit for receiving an output signal from the Direct Current gain unit and for passing a negatives output signal to the first array of fingers.

Advantageously the accelerometer includes means for supplying a square wave drive voltage to the fixed first, second, third and fourth finger arrays in anti-phase, which means includes a square wave generator, an in-phase unit for receiving an output signal from the square wave generator and for supplying an in-phase signal to the third and first arrays of fingers, an anti-phase unit for receiving an output signal from the square wave generator and for supplying an anti-phase signal to the fourth and second arrays of fingers, an integrator for receiving an output current from the proof mass and converting it to an output voltage, a band-pass filter for receiving the output voltage, a demodulator receiving an output signal from the band-pass filter and converting it to a direct current output signal, and a low pass filter for receiving the direct current output signal and for providing therefrom an open loop output signal.

For a better understanding of the present invention, and to show how the same may be carried into effect, reference will now be made, by way of example, to the accompanying drawings, in which.

Referring first to a capacitive accelerometer according to a first embodiment of the present invention as illustrated in FIGS. 1 to 6 of the accompanying drawings includes a substantially planar plate-like proof mass 1, four or more flexible mounting legs 2 each co-planar with the proof mass 1, and a substantially planar, ring-like support 3, in which the proof mass 1 is moveably mounted, which support 3 is fixedly mounted relative to the proof mass 1 and co-planar therewith. Each mounting leg 2 is connected at one end to the proof mass 1 and connected at another end to the support 3 so that the proof mass 1 is mounted for linear movement in a sensing direction in the plane containing the proof mass 1, mounting legs 2 and support 3, in response to acceleration change applied to the accelerometer. The mounting legs 2 extend substantially perpendicularly to the sensing direction generally indicated at 4 in FIG. 1.

The accelerometer according to the present invention includes a plurality of interdigitated capacitor fingers mounted, in a gaseous medium, which preferably is air, in the ring-like support 3 for sensing linear movement of, and for providing gaseous medium squeeze damping in the sensing direction 4 with the fingers, proof mass 1, mounting legs 2, support 3 being co-planar and formed from a single plate of mono-crystalline silicon.

The fingers comprise fixed first, second, third and fourth arrays 5, 6, 7 and 8 respectively of laterally spaced fingers 9 extending substantially perpendicularly to the sensing direction 4 away from the support 3 towards the proof mass 1. The first and second arrays 5 and 6 are located on one side of the proof mass 1 and the third and fourth arrays 7, 8 are located on the opposite side of the proof mass 1. The accelerometer also includes moveable fifth, sixth seventh and eighth arrays 10, 11, 12 and 13 of laterally spaced fingers 14 extending substantially perpendicularly to the sensing direction 4 from and attached to the proof mass 1 towards the support 3. The fifth and sixth arrays 10, 11 are located on said one side of the proof mass 1 and interdigitated respectively with the first and second arrays 5, 6 of fingers 9. The seventh and eighth arrays 12, 13 are located on said opposite side of the proof mass 1 and interdigitated respectively with the third and fourth arrays 7, 8. The interdigitation of the first and fifth arrays 5 and 10 and of the third and seventh arrays 7 and 12 is at a first offset d−δ in one direction in the sensing direction 4 from a median line (not shown) between adjacent fingers 9 in the first, second, third and fourth arrays 5, 6, 7 and 8. The interdigitation of the second and sixth arrays 6 and 11 and of the fourth and eighth arrays 8 and 13 are at a second offset d+δ equal and in the opposite direction in the sensing direction 4 to the first offset d−δ.

This will now be explained for example with reference to FIG. 1 of the accompanying drawings for the interdigitated moveable seventh array 12 of laterally spaced fingers 14, 14a and the interdigitated fixed third array 7 of fingers 9. The distance 15 represents the distance d+δ and the distance 16 represents d−δ. Hence for the arrays 7 and 12 the first offset is effectively −δ in the sensing direction 4 towards the arrays 7 and 12 end of the proof mass.

Figure 1:
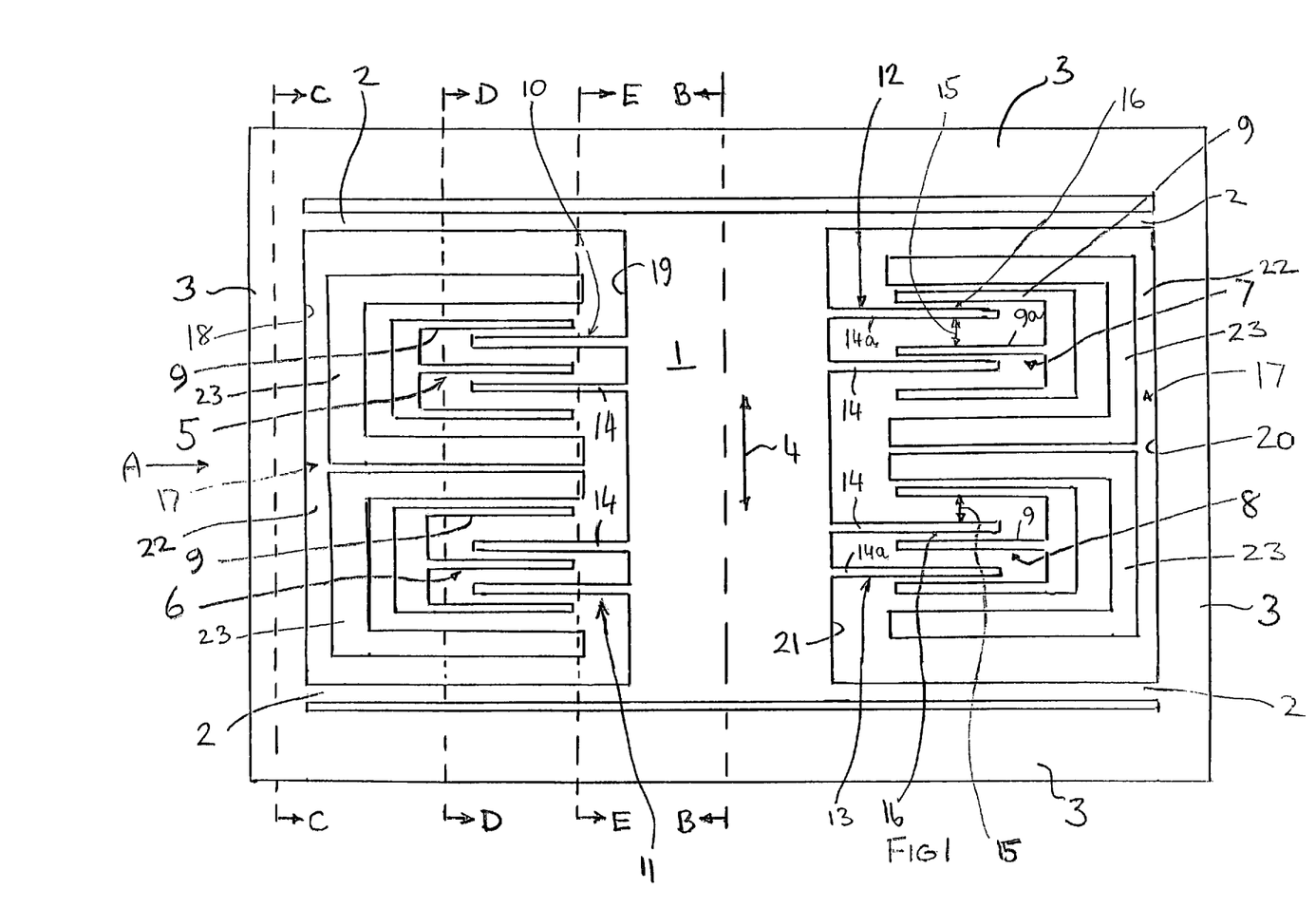
FIG. 1 shows in plan view an accelerometer according to a first embodiment of the present invention.
Figure 2:
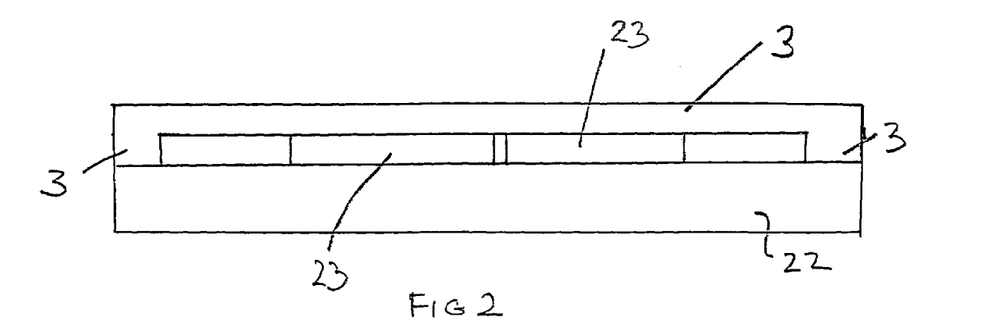
FIG. 2 is an end view taken in the direction A in FIG. 1.
Figure 3:
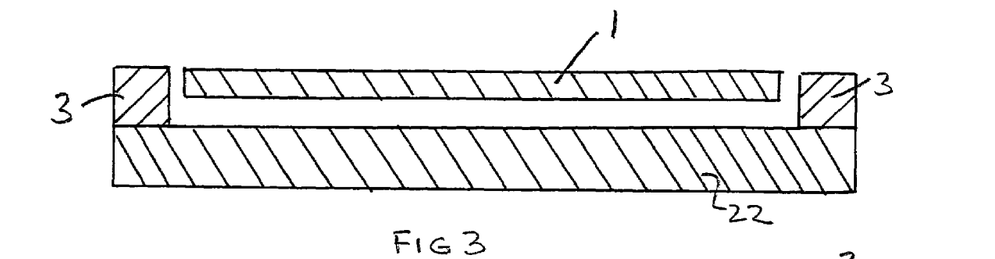
FIG. 3 is a sectional view taken along the line BB in FIG. 1.
Figure 4:
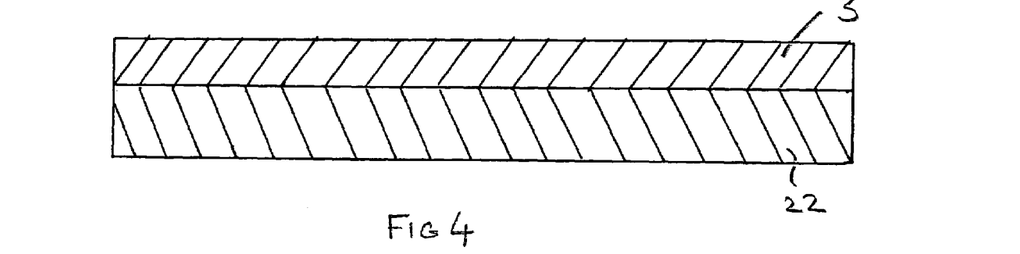
FIG. 4 is a cross-sectional view taken along the line CC in FIG. 1.
Figure 5:
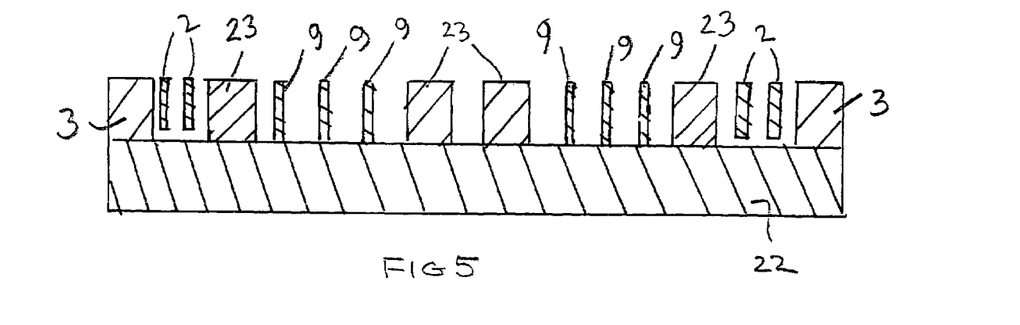
FIG. 5 is a cross-sectional view taken along the line DD in FIG. 1.
Figure 6:
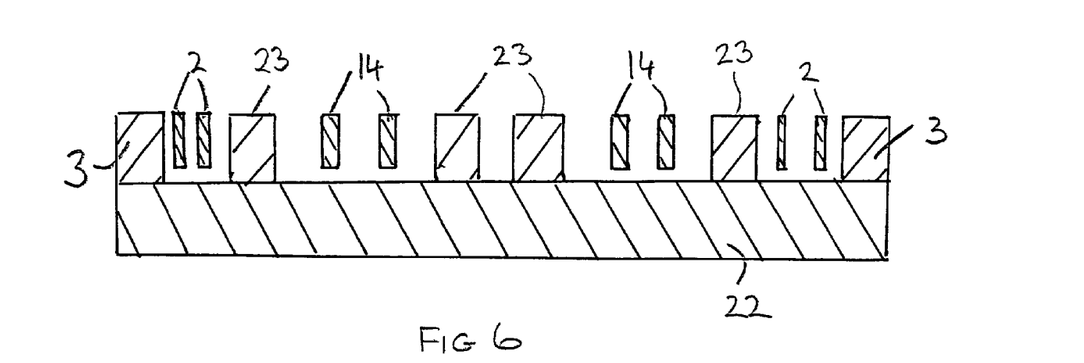
FIG. 6 is a cross-sectional view taken along the line EE in FIG. 1.

Looking at the fourth fixed array 8 and the eighth moveable array 13 the distance 15 is uppermost on FIG. 1 making the second offset effectively +δ for this pair of interdigitated arrays. Considering in further detail the interdigitated third array 7 and seventh array 12 the electrostatic force F (Newton's) is given by;

$$F = eE \qquad (1)$$

Where E is the electrostatic field and e is the charge. The two moveable fingers 14 and 14a which are fixed to the proof mass 1 have a voltage V1 and the middle finger 9a of the array 7 which is fixed with respect to the support 3 has a voltage V2. The central finger 9a is displaced from the median point from the moveable fingers 14 and 14a by an amount δ. The proof mass 1 is held at a fixed voltage V1 while the central finger 9a is held at a variable voltage V2. Considering the forces on the proof mass 1 due to the single assembly:

$$F = q(E_1 - E_2) = C(V_1 - V_2)(E_1 - E_2) \qquad (2)$$

$$C = C_1 + C_2 = \frac{A\varepsilon_0}{d}\left(1 - \frac{\delta}{d} + 1 + \frac{\delta}{d}\right) = \frac{2A\varepsilon_0}{d} \qquad (3)$$

$$E_1 - E_2 = (V_1 - V_2)\left(\frac{1}{d-\delta} - \frac{1}{d+\delta}\right) = (V_1 - V_2)\left(\frac{2\delta}{d^2}\right) \qquad (4)$$

thus $$F = \left(\frac{4A\varepsilon_0 \delta}{d^3}\right)(V_1 - V_2)^2 \qquad (5)$$

The force is therefore a quadratic function of the voltage when this form of finger pairs is used. In practice there is a set of n fingers 9, 14 where $\delta$ is positive with a positive voltage $V_2$ and another set of n fingers 9, 14 where $\delta$ is negative with a negative voltage $V_2$. Thus the overall force for all the fingers is given by:

$$F_1 + F_2 = \frac{4n\delta A\varepsilon_0}{d^3}[(V_1 - V_2)^2 - (V_1 + V_2)^2] \qquad (6)$$

$$= \frac{16n\delta A\varepsilon_0}{d^3} V_1 V_2$$

A bias voltage V1 is thus applied to the proof mass 1 and a variable voltage V2 is applied to the support 3. The scale factor of the accelerometer is thus set by the applied drive voltage to the proof mass and this will need to be set to a high level of accuracy to meet a typical scale factor accuracy requirement of 0.1% over a g range of up to 100 g. for example, where n=60
d=10 micron
$\delta$=3 micron
$V_1$=15V
$V_2$ lies between −15V and +15V
$\varepsilon_0$=8.86 $10^{-12}$ (permitivity of free space)
A=depth of silicon (140 microns)*length of fingers (2 mm)=2.8e-7 m².

This gives a force of 2.2 $10^{-3}$ N.

If the proof mass is 2 milli-grams in weight, 1 g acceleration requires 1.96e-5 N, so with +/−15V it will be possible to null out to 100 g. With typical finger width of 15 microns with 6 microns gaps it is possible to have 120 fingers in 5 mm width of silicon.

The proof mass 1, mounting legs 2, support 3 and interdigitated fingers 9, 9a, 14 and 14a are formed by dry etching, preferably by deep reactive ion etching, from a plate of silicon which is orientated in the (111) or (100) crystal plane. As can be seen from FIGS. 1 to 6 of the accompanying drawings the support 3 has a substantially rectangular ring-like shape surrounding an inner open area 17 in which is located the proof mass 1 which preferably has a substantially rectangular shape as illustrated and wherein the mounting legs 2 extend substantially perpendicularly to the sensing direction 4 in spaced array with at least four between a first inner wall 18 of the support 3 defining the inner open area 17 and a facing first outer wall 19 of the proof mass 1 and with at least four between the opposing second inner wall 20 of the support 3 defining the inner open area 17 and the facing second outer wall 21 of the proof mass 1. The mounting legs 2 have high compliance in the sensing direction 4 and low compliance in other directions.

The accelerometer of the present invention also includes a support sheet 22 of non-conductive material on which is fixedly mounted the support 3 and first, second, third and fourth arrays 5, 6, 7 and 8 of fingers 9 with the mounting legs 2, proof mass 1 and fifth, sixth, seventh and eighths arrays 10, 11, 12 and 13 of fingers 14 being spaced from the support sheet 22. The support sheet 22 is made of glass, preferably Pyrex (registered trade mark) glass to form a wafer structure, and the first, second, third and fourth arrays, 5, 6, 7 and 8 of fingers 9 are fixedly mounted on the glass support sheet by anodic bonding thereto. The use of anodically bonding the silicon to the glass support sheet 22 has the advantage of electrically isolating the capacitance of the interdigitated fingers from the ground plane. Small capacitance charges are very important for the accuracy of the accelerometer.

The fingers 9, 9a, 14 and 14a are suspended along their length and supported on the support sheet 22 in the inner open area 17 of the support 3 but are electrically isolated from the support 3. To this end each array of fingers is provided with an earth screen 23 of which there are four in the illustrated embodiment. Each screen 23 is located within the inner open area 17 and is associated with and partially surrounds a respective one of the first, second, third and fourth arrays, 5, 6, 7 and 8 of fingers and is operable to shield the arrays of fingers from the support 3 and is electrically insulated from the support 3. To this end the screens 23 are attached to the support sheet 22 which is electrically isolated from the support 3. The earth screens 23 for the first and second arrays 5, 6, of fingers 9, 9a are normally electrically at zero voltage. This improves the isolation of the high voltage drive from the low-level signal that is on the rest of the support 3 and the group mass 1. The earth screens 23 associated with the third and fourth arrays 7, 8 of fingers 9, 9a are set to zero voltage to isolate the drive from the support 3. Preferably the earth screens 23 are fixedly mounted on the glass support sheet 22 by anodic bonding thereto.

The proof mass 1 and supporting mounting legs 2 are suspended above the support sheet 22 in the inner open area 17. Although four such legs 2 are illustrated there may be any higher number present such as sixteen for each of the four end corners of the proof mass 1 making a total of sixty four legs 2. The number of legs chosen is such as to give the desired resonant frequency of the approved mass assembly. The legs 2 preferably are mounted at all four corners of the proof mass 1 in order to give maximum rigidity against cross axis acceleration. In this way the accelerometer illustrated is a planar accelerometer with the sensing axis 4 in the plane of the accelerometer device.

The number of fingers and legs utilised and the gaps therebetween are chosen to give critical damping by gaseous medium squeeze film damping. To this end the accelerometer may be encapsulated to provide an inner environment which is typically at atmospheric pressure. Although the gaseous medium can be air the preferred medium is dry nitrogen which is used to fill the encapsulated inner open area 17 of the accelerometer but other gases such as helium or neon can be used if desired. Preferably the gases have a dew point below the lowest operational temperature of the accelerometer to avoid risk of condensation forming within the accelerometer.

Figure 7:
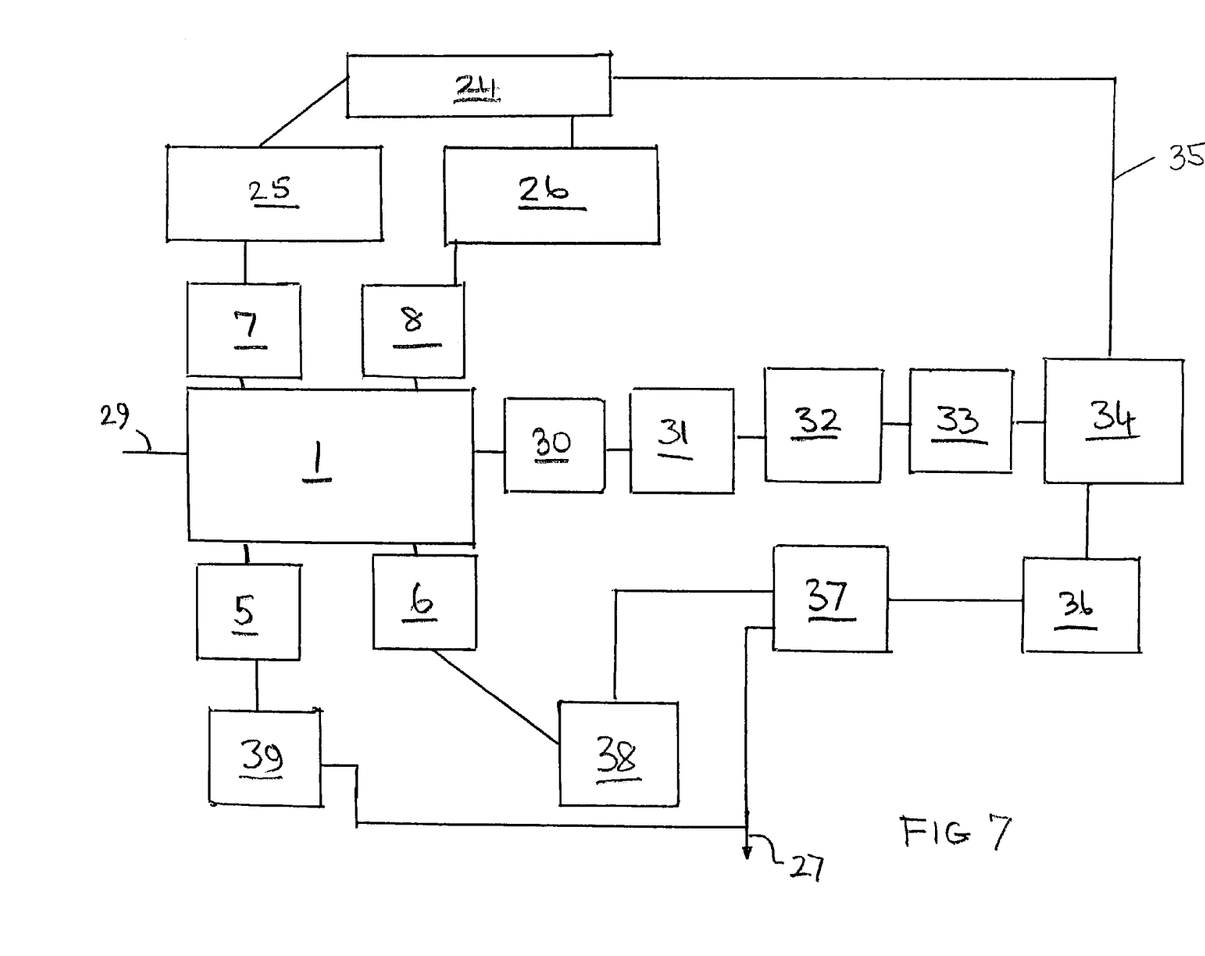
FIG. 7 is a schematic diagram of means for supplying a square wave drive voltage to the fixed third and fourth finger arrays in anti-phase in a closed loop configuration for use with the accelerometer of FIGS. 1 to 6.

The accelerometer according to the present invention also includes means for supplying a square wave drive voltage to the fixed first, second, third and fourth finger arrays 7 and 8 in anti-phase. In the closed loop configuration as shown in FIG. 7 of the accompanying drawings this means includes a square wave generator 24 which essentially generates a square wave output signal at typically 100 kHz that forms the signal to drive the proof mass 1 through the third and fourth arrays 7, 8 of fingers. To this end the means includes an in-phase unit 25 for receiving an output signal from the square wave generator 24 and providing an in-phase signal to the third array of seven fingers. An anti-phase unit 26 is provided for receiving an output signal from the square wave generator 24 and for supplying an anti-phase signal to the fourth array 8 fingers. The proof mass is typically driven in this way at a high voltage of fifteen volts as the gain of the accelerometer is proportional to drive voltage. Arrays 7 and 8 have opposite offsets as previously described and are driven with anti-phase signals to give a net positive force in the same direction. The earth screens 23 around the arrays 7 and 8 are set to zero voltage.

An input Direct Current bias voltage V1 is provided to the proof mass 1 at input 29 for closed loop operation. The means also includes a DC blocking capacitor 30 through which an output signal from the proof mass 1 is passed to eliminate the bias of voltage on the proof mass 1. The output signal from the capacitor 30 then goes to an integrator 31 which provides an output voltage proportional to the displacement of the proof mass 1 from the mean position. As the proof mass 1 is electrically connected to the support 3 by the use of high conductivity silicon, typically using the [100] plane, the output signal can be obtained by wire bonding to a bond pad on the support 3 (not shown). AC gain is applied to the signal via an Alternating Current gain unit 32. Further gain can be added to improve the overall loop characteristics. The signal then goes through a band-pass filter 33 centred at the normal square wave generator frequency to remove unwanted frequency components prior to demodulation at a demodulator 34. The signal is demodulated at the demodulator 34 at normal frequency with respect to a reference derived from the signal generator 24 via line 35. This gives rise to an error signal with respect to the mean position which is then taken through a loop filter 36 and applied as a feedback signal to the first and second arrays 5, 6 of drive fingers after voltage amplification via a DC gain unit 37, a positive gain unit 38 and a negative gain unit 39. The drive voltage is therefore a measure of applied acceleration. This serves to close the loop so that under acceleration the proof mass 1 does not move with the inertial forces being balanced by the electrostatic forces. The output signal 27 from the system is taken from the DC gains unit 37.

Figure 8:
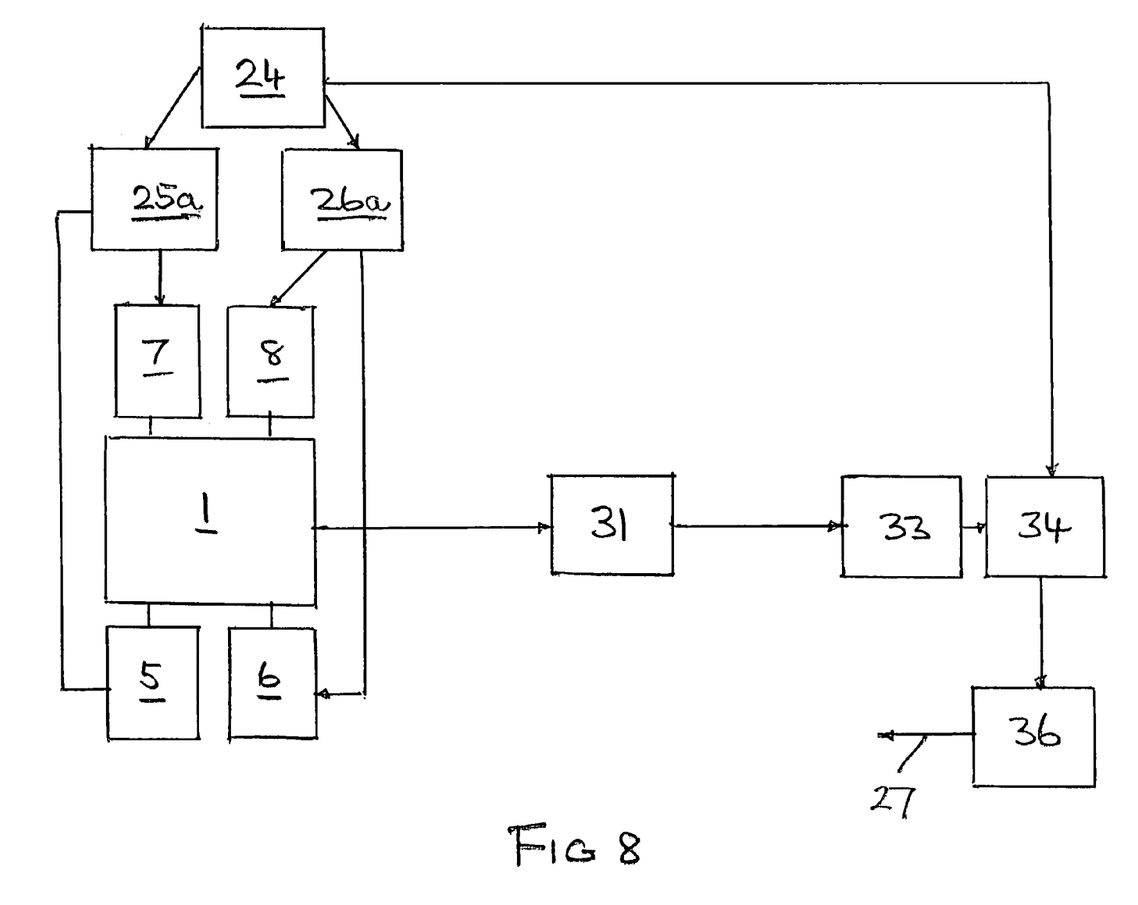
FIG. 8 is a schematic diagram of means for supplying a square wave drive voltage to the fixed first, second, third, and fourth finger arrays in anti-phase in an open loop configuration for use with the accelerometer of FIGS. 1 to 6.

In an open loop configuration as shown in FIG. 8 of the accompanying drawings like parts have been given like reference numerals to those shown in FIG. 7 and will not be further described in detail. In FIG. 8 the generator 24 generates a square wave at a typical frequency of 100 kHz and drives the proof mass 1 through the fixed first, second, third and fourth finger arrays 5, 6, 7, 8 in anti-phase. This square wave signal is passed to an in-phase, non-inverting amplifier unit 26a and to an out-of-phase, inverting amplifier unit 25a. The output signal from the unit 25a is provided to the finger arrays 7 and 5 and the output signal from the unit 26a is provided to the finger arrays 8 and 6. The magnitude of these output signals is accurately set by the units 25a and 26a.

The interdigitated fingers are electrically insulated from the proof mass 1 which is attached to the support 3 by the mounting legs 2. The support 3 is electrically connected to the integrator 31 which acts as a transimpedance amplifier converting the current from the 100 kHz signal to a voltage at 100 kHz. This latter voltage signal is then passed through the band-pass filter 33 which also acts as an AC gain stage and then to the demodulator 34. The demodulator 34 acts as a full wave rectifier to convert the signal from the proof mass 1 at 100 kHz to a Direct Current signal which is then passed to the low pass filter 36.

The output 27 from the filter 36 forms the open loop output signal which is proportional to the applied g force.

The use of interdigitated drive fingers combines the effects of gaseous medium squeeze film damping and the provision of a large capacitance for easy drive with an adequate level of force for force feedback. This provides benefits over an inductive accelerometer by reducing cost, size and complexity without degrading functionality. The accelerometer of the present invention thus offers a linear scale factor with applied voltage with the best use of a push-pull output drive stage to thereby reduce the voltage limits required. The use of anodically bonded glass with the silicon gives rise to improved isolation of the capacitor fingers compared with silicon fusion bonding which is an alternative. The rectangular geometry of the proof mass 1 with supporting legs 2 gives good robustness against high g shock and against cross axis accelerations.

The invention claimed is:

1. An accelerometer comprising:
a substantially planar plate-like proof mass,
at least four flexible mounting legs each co-planar with the proof mass,
a substantially planar, ring-like support, wherein the proof mass is moveably mounted relative to the support,
with each mounting leg being connected at one end to the proof mass and connected at another end to the support so that the proof mass is mounted for linear movement in a sensing direction in the plane containing the proof mass, mounting legs and support, in response to acceleration change applied to the accelerometer, and with the mounting legs extending substantially perpendicularly to the sensing direction,
a plurality of interdigitated capacitor fingers mounted, in a gaseous medium, in the ring-like support for sensing linear movement of, and for providing gaseous medium squeeze damping for, the proof mass in the sensing direction, with the fingers, proof mass, mounting legs and support being co-planar and formed from a single plate of mono-crystalline silicon,
which fingers comprise fixed first, second, third and fourth arrays of laterally spaced fingers extending substantially perpendicularly to the sensing direction and away from the support towards to the proof mass, with the first and second arrays being located on one side of the proof mass and with the third and fourth arrays being located on the opposite side of the proof mass, and moveable fifth, sixth, seventh and eighth arrays of laterally spaced fingers extending substantially perpendicularly to the sensing direction from and attached to the proof mass towards the support, with the fifth and sixth arrays being located on said one side of the proof mass and interdigitated respectively with the first and second arrays and with the seventh and eighth arrays being located on said opposite side of the proof mass and interdigitated respectively with the third and fourth arrays, with the interdigitation of the first and fifth arrays and of the third and seventh arrays being at a first offset in one direction in the sensing direction from a median line between adjacent fingers in the first, second, third and fourth arrays, and with the interdigitation of the second and sixth arrays and of the fourth and eighth arrays being at a second offset equal and in the opposite direction to the first offset, and means for providing a first drive voltage to the first offset arrays of fingers and an equal and opposite second drive voltage to the second offset arrays of fingers such that the interdigitated fingers provide for the proof mass sensing of displacement in response to acceleration applied to the accelerometer, drive and damping of displacement.

2. An accelerometer according to claim 1, wherein the proof mass, mounting legs, support and interdigitated fingers are formed by dry etching from a plate of silicon which is orientated in the (111) or (100) crystal plane.

3. An accelerometer according to claim 1, wherein the support has a substantially rectangular ring-like shape surrounding an inner open area in which is located the proof mass which has a substantially rectangular shape, and wherein the mounting legs extend substantially perpendicularly to the sensing direction in spaced array, with at least two between a first inner wall of the support defining the inner open area and a facing first outer wall of the proof mass and with at least two between an opposing second inner wall of the support defining the open inner area and a facing second outer wall of the proof mass.

4. An accelerometer according to claim 3, wherein the mounting legs have high compliance in the sensing direction and low compliance in other directions.

5. An accelerometer according to claim 4, including a support sheet of non-conductive material on which is fixedly mounted the support, first, second, third and fourth arrays of fingers with the mounting legs, proof mass and fifth, sixth, seventh and eighth arrays of fingers being spaced from the support sheet.

6. An accelerometer according to claim 5, wherein the support sheet is made of glass to which the support and first, second, third and fourth arrays of fingers are fixedly mounted by anodic bonding.

7. An accelerometer according to claim 6, including at least four earth screens located within the inner open area, each being associated with and partially surrounding a respective one of the first, second, third and fourth arrays of fingers, being operable to shield the arrays of fingers from the support and being electrically insulated from the support.

8. An accelerometer according to claim 7, wherein the earth screens are fixedly mounted by anodic bonding on the glass support sheet.

9. An accelerometer according to claim 8, including means for supplying a square wave drive voltage to the fixed first, second, third and fourth finger arrays in anti-phase, which means includes a square wave generator, an in-phase unit for receiving an output signal from the square wave generator and for supplying an in-phase signal to the third array of fingers, an anti-phase unit for receiving an output signal from the square wave generator and for supplying an anti-phase signal to fourth array of fingers, a demodulator for receiving a frequency signal from the square wave generator, a device for supplying a direct current bias voltage to the proof mass, a capacitor for receiving an output signal from the proof mass, an integrator for receiving an output signal from the capacitor, an Alternating Current gain unit for receiving an output signal from the integrator, a band-pass filter for receiving an output signal from the Alternating Current gain unit and for passing an output signal to the demodulator, a loop filter for receiving an output signal from the demodulator, a Direct Current gain unit for receiving an output signal from the loop filter, a positive gain unit for receiving an output signal from the Direct Current gain unit and for passing a positive output signal to the second array of fingers, and a negative gain unit for receiving an output signal from the Direct Current gain unit and for passing a negative output signal to the first array of fingers.

10. An accelerometer according to claim 8, including means for supplying a square wave drive voltage to the fixed first, second, third and fourth finger arrays, which means includes a square wave generator, an in-phase unit for receiving an output signal from the square wave generator and for supplying an in-phase signal to the third and first arrays of fingers, an anti-phase unit for receiving an output signal from the square wave generator and for supplying an anti-phase signal to the fourth and second arrays of fingers, an integrator for receiving an output current from the proof mass and converting it to an output voltage, a band-pass filter for receiving the output voltage, a demodulator receiving an output signal from the band-pass filter and converting it to a direct current output signal, and a low pass filter for receiving the direct current output signal and for providing therefrom an open loop output signal.

* * * * *